United States Patent
Son et al.

(10) Patent No.: US 9,720,274 B2
(45) Date of Patent: Aug. 1, 2017

(54) POLARIZATION MEMBER AND DISPLAY DEVICE INCLUDING THE SAME

(71) Applicant: SAMSUNG DISPLAY CO., LTD., Yongin, Gyeonggi-Do (KR)

(72) Inventors: Ju Youn Son, Hwaseong-si (KR); Yong Kyu Kang, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 30 days.

(21) Appl. No.: 14/699,505

(22) Filed: Apr. 29, 2015

(65) Prior Publication Data

US 2016/0178958 A1 Jun. 23, 2016

(30) Foreign Application Priority Data

Dec. 19, 2014 (KR) ........................ 10-2014-0184541

(51) Int. Cl.
  *G02F 1/1335* (2006.01)
  *G02B 5/02* (2006.01)
  *G02B 5/30* (2006.01)
  *G02B 1/14* (2015.01)
  *G02B 1/04* (2006.01)

(52) U.S. Cl.
  CPC ......... *G02F 1/133504* (2013.01); *G02B 1/04* (2013.01); *G02B 1/14* (2015.01); *G02B 5/0215* (2013.01); *G02B 5/0294* (2013.01); *G02B 5/3033* (2013.01); *G02F 1/133528* (2013.01)

(58) Field of Classification Search
  CPC ......... G02F 1/133504; G02F 1/133528; G02B 1/14; G02B 1/04; G02B 5/0215; G02B 5/0294; G02B 5/3033
  See application file for complete search history.

(56) References Cited

U.S. PATENT DOCUMENTS

| 6,897,911 B2 * | 5/2005 | Yamaguchi | G02B 3/0056 349/57 |
| 2015/0369972 A1 * | 12/2015 | Asaoka | G02F 1/1335 359/599 |

FOREIGN PATENT DOCUMENTS

| JP | 2012-078420 | 4/2012 |
| KR | 1020100003486 | 1/2010 |
| KR | 1020100134318 | 12/2010 |
| KR | 1020110034926 | 4/2011 |

* cited by examiner

*Primary Examiner* — Nathanael R Briggs
(74) *Attorney, Agent, or Firm* — F. Chau & Associates, LLC (57) ABSTRACT

A polarization member of a display device includes a polarizing layer which polarizes light; and a light scattering layer which has a first surface which faces the polarizing layer and a second surface, and scatters light received from the polarizing layer, wherein the light scattering layer comprises curved recessed patterns on the first surface.

18 Claims, 9 Drawing Sheets

POLARIZATION MEMBER AND DISPLAY DEVICE INCLUDING THE SAME

This application claims priority under 35 USC §119 from Korean Patent Application No. 10-2014-0184541 filed on Dec. 19, 2014 in the Korean Intellectual Property Office, and all the benefits accruing therefrom, the contents of which are herein incorporated by reference in their entirety.

BACKGROUND

1. Technical Field

Embodiments of the present disclosure are directed to a polarization member and a display device including the same.

2. Discussion of the Related Art

Liquid crystal displays (LCDs) are one of the most widely used types of flat panel displays. In general, an LCD includes a pair of substrates having electric field generating electrodes such as pixel electrodes and a common electrode and a liquid crystal layer interposed between the substrates. An LCD applies an electric field to the liquid crystal layer by applying voltages to the electric field generating electrodes. Accordingly, the orientation of liquid crystal molecules of the liquid crystal layer is determined, and the polarization of incident light is controlled. As a result, an image is displayed on the LCD.

One type of LCD is a vertical alignment (VA)-mode LCDs. In a VA-mode LCD, when no electric field is applied to liquid crystal molecules, the liquid crystal molecules align such that their long axes are perpendicular to the display substrates.

A VA-mode LCD typically uses a vertical alignment layer and liquid crystals having a negative dielectric anisotropy. In a VA-mode LCD, when no voltage is applied to the liquid crystals, light is blocked by two vertical polarization plates. On the other hand, when a voltage is applied to the liquid crystals of a VA-mode LCD, liquid crystal molecules may tilt, causing birefringence. Accordingly, the polarization direction of incident light may be rotated, allowing the incident light to propagate through a sample. In addition, when a voltage is applied to the liquid crystals of a VA-mode LCD, the liquid crystal molecules may be aligned only in a specific direction. This can result in poor viewing angle characteristics.

SUMMARY

Embodiments of the present disclosure can provide a polarization member which can evenly laterally disperse light output from a polarizing layer.

Embodiments of the present disclosure can also provide a display device having superior lateral visibility.

According to an embodiment of the present disclosure, there is provided a polarization member that includes a polarizing layer which polarizes light; and a light scattering layer which has a first surface which faces the polarizing layer and a second surface, and scatters light received from the polarizing layer, wherein the light scattering layer comprises curved recessed patterns on the first surface.

The recessed patterns may extend along one direction.

A cross-section of each of the recessed patterns may have a semicircular or semielliptical shape.

The recessed patterns may include a first intaglio pattern and a second intaglio pattern separated from each other, wherein the first intaglio pattern and the second intaglio pattern are alternately formed on the first surface.

An aspect ratio of the first intaglio pattern may differ from an aspect ratio of the second intaglio pattern.

A distance between the first intaglio pattern and the second intaglio pattern may be less than a width of each of the first intaglio pattern and the second intaglio pattern.

The polarization member may further include an adhesive layer which bonds the polarizing layer and the light scattering layer together; and a refractive layer disposed in a space defined by the adhesive layer and each of the recessed patterns, wherein a refractive index of the refractive layer is smaller than that of the light scattering layer.

The refractive layer may include air.

The polarization member may further include a protective layer disposed on a side of the light scattering layer, wherein the protective layer contains at least one of polyethylene terephthalate (PET) and tri-acetate cellulose (TAC).

According to another embodiment of the present disclosure, there is provided a display device that includes a display panel for displaying an image using light; and a first polarization member disposed on a side of the display panel and which polarizes light from the display panel in a first direction. The first polarization member includes: a polarizing layer which polarizes light; and a light scattering layer which has a first surface that faces the polarizing layer and a second surface, and scatters light received from the polarizing layer, wherein the light scattering layer comprises curved recessed patterns on the first surface.

The recessed patterns may extend along a direction.

A cross-section of each of the recessed patterns may have a semicircular or semielliptical shape.

The recessed patterns may include a first intaglio pattern and a second intaglio pattern separated from each other, wherein the first intaglio pattern and the second intaglio pattern are alternately formed on the first surface An aspect ratio of the first intaglio pattern may differ from an aspect ratio of the second intaglio pattern.

A distance between the first intaglio pattern and the second intaglio pattern may be less than a width of each of the first intaglio pattern and the second intaglio pattern.

The first polarization member may further include: an adhesive layer which bonds the polarizing layer and the light scattering layer together; and a refractive layer disposed in a space defined by the adhesive layer and each of the recessed patterns, wherein a refractive index of the refractive layer is less than that of the light scattering layer.

The refractive layer may include air.

The first polarization member may further include a protective layer which is disposed on a side of the light scattering layer, wherein the protective layer contains at least one of PET and TAC.

According to another embodiment of the present disclosure, there is provided a polarization member that includes a polarizing layer which polarizes light; and a light scattering layer that has a first surface which faces the polarizing layer and a second surface, and scatters light received from the polarizing layer, wherein the light scattering layer comprises semi-ellipsoidal-shaped recessed patterns on the first surface.

The recessed patterns may include a first intaglio pattern and a second intaglio pattern separated from each other, wherein the first intaglio pattern and the second intaglio pattern are alternately formed on the first surface, an aspect ratio of the first intaglio pattern differs from an aspect ratio of the second intaglio pattern, and a distance between the first intaglio pattern and the second intaglio pattern is less than a width of each of the first intaglio pattern and the second intaglio pattern.

DETAILED DESCRIPTION OF EXEMPLARY EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein.

The description that one element is connected to or coupled to another element includes both a case where the one element is directly connected to the another element or a case where further another element is interposed between the elements. Herein, when one value is described as being about equal to another value, it is to be understood that the values are equal to each other to within a measurement error, or if measureably unequal, are close enough in value to be functionally equal to each other as would be understood by a person having ordinary skill in the art.

Exemplary embodiments of the present disclosure will now be described with reference to the attached drawings. A liquid crystal display (LCD) will hereinafter be described as an example of a display device according to embodiments of the present disclosure. However, a display device according to embodiments of the present disclosure is not limited to an LCD and may also be an electrophoretic display, an organic light-emitting display, an inorganic electroluminescent display, a field emission display, a surface-conduction electron-emitter display, a plasma display, a cathode ray display, etc.

Figure 1:
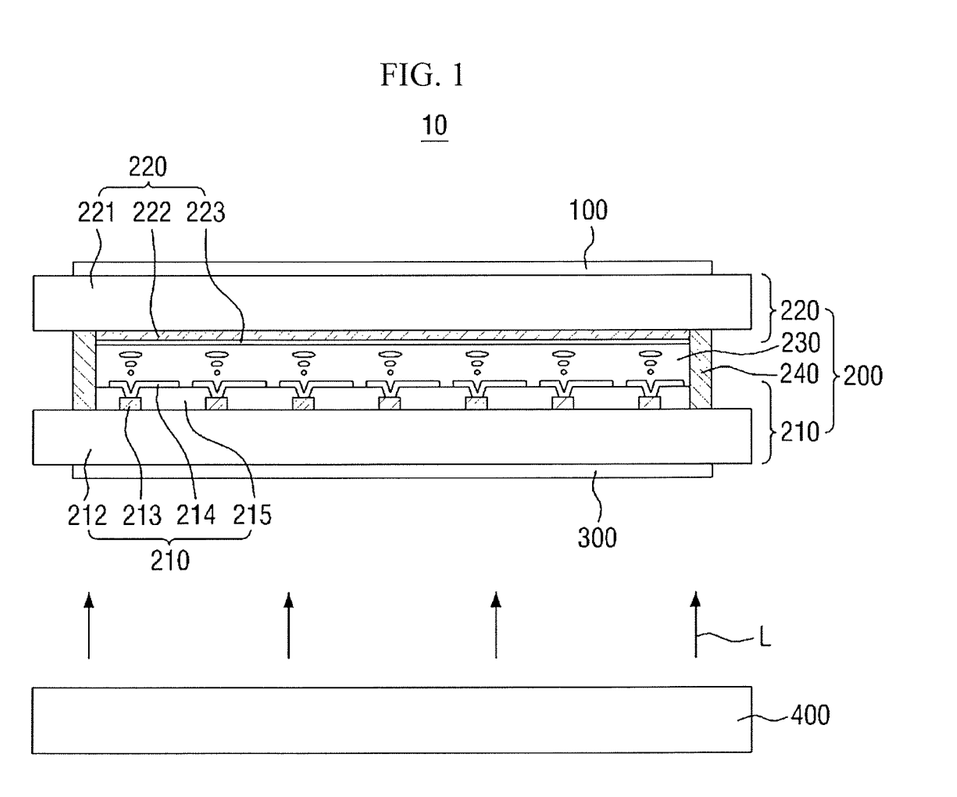
FIG. 1 is a cross-sectional view of a liquid crystal display (LCD) according to an embodiment of the present disclosure.

FIG. 1 is a cross-sectional view of an LCD 10 according to an embodiment of the present disclosure.

Referring to FIG. 1, the LCD 10 according to a current embodiment includes an LCD panel 200 which has a first surface and a second surface and displays an image using light, a first polarization plate 100 which is disposed on the first surface of the LCD panel 200, a second polarization plate 300 which is disposed on the second surface of the LCD panel 200, and a backlight assembly 400 which provides light L to the LCD panel 200.

The LCD panel 200 may include an array substrate 210, a counter substrate 220 which faces the array substrate 210 and is coupled to the array substrate 210, a liquid crystal layer 230 which is interposed between the array substrate 210 and the counter substrate 220, and a sealant 240 which couples the array substrate 210 and the counter substrate 220 together.

The array substrate 210 may include a first base substrate 212 in which a plurality of pixel regions for displaying images are defined, a thin-film transistor (TFT) 213 which is disposed in each of the pixel regions, a pixel electrode 214 which is disposed in each of the pixel regions and electrically connected to the TFT 213, and an insulating layer 215 which is disposed on the first base substrate 212 to cover the TFTs 213.

The counter substrate 220 is disposed on the array substrate 210. The counter substrate 220 includes a second base substrate 221, a color filter layer 222 which is disposed on a lower surface of the second base substrate 221 and expresses a specific color using light, and a common electrode 223 which is disposed on the color filter layer 222 and outputs a common voltage. The liquid crystal layer 230 may control the transmittance of light L emitted from the backlight assembly 400 according to an electric field formed between the pixel electrodes 214 and the common electrode 223.

The second polarization plate 300 is disposed between the LCD panel 200 and the backlight assembly 400. The second polarization plate 300 may polarize the light L emitted from the backlight assembly 400 and propagating to the LCD panel 200.

The first polarization plate 100 may polarize light from the LCD panel 200 in a direction orthogonal to the second polarization plate 300. The structure of the first polarization plate 100 will now be described in more detail.

Figure 2:
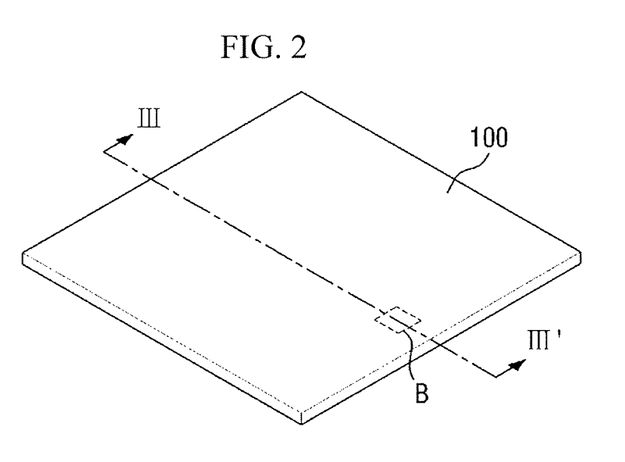
FIG. 2 is a perspective view of a first polarization plate of the LCD illustrated in FIG. 1.
Figure 3:
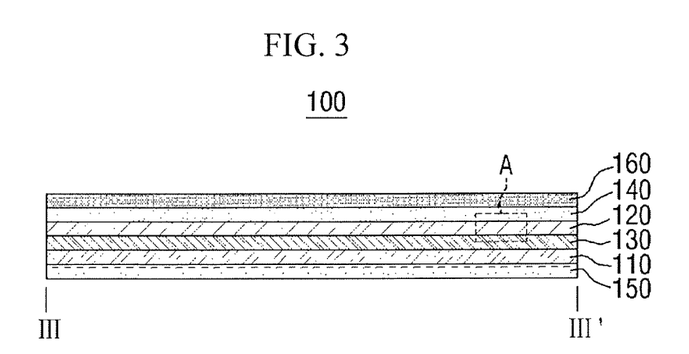
FIG. 3 is a cross-sectional view taken along the line III-III' of FIG. 2.

FIG. 2 is a perspective view of the first polarization plate 100 of the LCD 10 illustrated in FIG. 1. FIG. 3 is a cross-sectional view taken along the line III-III' of FIG. 2.

Referring to FIG. 2, the first polarization plate 100 of the LCD 10 illustrated in FIG. 1 may be an optical sheet having a quadrilateral shape as illustrated in FIG. 2. However, the shape of the first polarization plate 100 is not limited to a quadrilateral shape.

Referring to FIG. 3, the first polarization plate 100 may include a polarizing layer 110, a light scattering layer 120, an adhesive layer 130, a first protective layer 140, a second protective layer 150, and a surface treatment layer 160.

In the first polarization plate 100 of the LCD 10 according to a current embodiment, the light scattering layer 120 may be disposed on a first side of the polarizing layer 110, and the first protective layer 140 may be disposed on a first side of the light scattering layer 120 as illustrated in FIG. 3. That is, the first polarization plate 100 may have a structure in which the polarizing layer 110, the light scattering layer 120 and the first protective layer 140 are stacked sequentially on a first side.

The polarizing layer 110 may have a transmission axis. The polarizing layer 110 may linearly polarize light incident from an external source in the same direction as the transmission axis thereof and transmit the linearly polarized light. The polarizing layer 110 may be, but is not limited to, a stretched polyvinyl alcohol (PVA)-based film on which a dichromatic pigment has been absorbed and oriented. The polarizing layer 110 may have a thickness of, but not limited to, about 5 to about 40 μm.

The light scattering layer 120 may scatter light received from the polarizing layer 110. The light scattering layer 120 may have a first surface and a second surface and may face the polarizing layer 110. The light scattering layer 120 may include curved recessed patterns on the first surface which faces the polarizing layer 110 to evenly scatter light received from the polarizing layer 110. The structure of the recessed patterns will be described later.

The adhesive layer 130 may be used to bond the polarizing layer 110 and the light scattering layer 120 together. The adhesive layer 130 may be disposed on the first side of the polarizing layer 110 and a second side of the light scattering layer 120 as illustrated in FIG. 3. The polarizing layer 110 and the light scattering layer 120 may be bonded together by the adhesive layer 130. The adhesive layer 130 may contain, but is not limited to, a pressure sensitive adhesive (PSV). The adhesive layer 130 may have a thickness of, but not limited to, about 30 μm or less.

The first protective layer 140 and the second protective layer 150 may protect the polarizing layer 110. The first protective layer 140 has a first surface and a second surface and is placed on the first side of the polarizing layer 110 to face the polarizing layer 110. The second protective layer 150 may be disposed on a second side of the polarizing layer 110. The first protective layer 140 and the second protective layer 150 may be made of a non-optical material such that characteristics of light polarized by the polarizing layer 110 are not changed. Each of the first protective layer 140 and the second protective layer 150 may have a thickness of, but not limited to, about 1 to about 500 μm.

The first protective layer 140 may contain at least one of polyethylene terephthalate (PET) or tri-acetate cellulose (TAC).

Specifically, a first protective layer 140 that contains PET may be thinner than other plastic films but may have better mechanical properties, such as tensile modulus, impact strength, and bursting strength. In addition, in a PET-containing first protective layer 140, the dimensions may unaffected by heat (thermal characteristics), and a PET-containing first protective layer 140 may be glossy due to its high transparency and flat surface (optical characteristics). A PET-containing first protective layer 140 may also have a high light transmittance of about 85 to about 95% in a visible light region. Since the first protective layer 140 can block external factors such as moisture and oxygen, it can completely absorb light having a wavelength of about 310 μm or less, thereby preventing bleaching and corrosion. PET may be prepared by esterification and then polymerization of terephthalate acid (TPA) and ethylene glycol (EG).

The second protective layer 150 may be attached to any one surface of a functional film such as a phase difference compensation film. Accordingly, the second protective layer 150 may be implemented as a film having a phase compensation function as well.

The surface treatment layer 160 may improve the functions of the LCD 10 according to a current embodiment. The surface treatment layer 160 is disposed on a first side of the first protective layer 140 and surface-treated with at least one of, but not limited to, an anti-glare treatment, an anti-reflective treatment, and a hard coating treatment.

The first polarization plate 100 may be attached onto an upper surface of the second base substrate 221 by an adhesive layer and fixed to the LCD 200 accordingly. The second polarization plate 300 may also include an adhesive layer and may be attached to the first base substrate 212 by the adhesive layer.

The structure of the light scattering layer 120 will now be described in detail.

Figure 4:
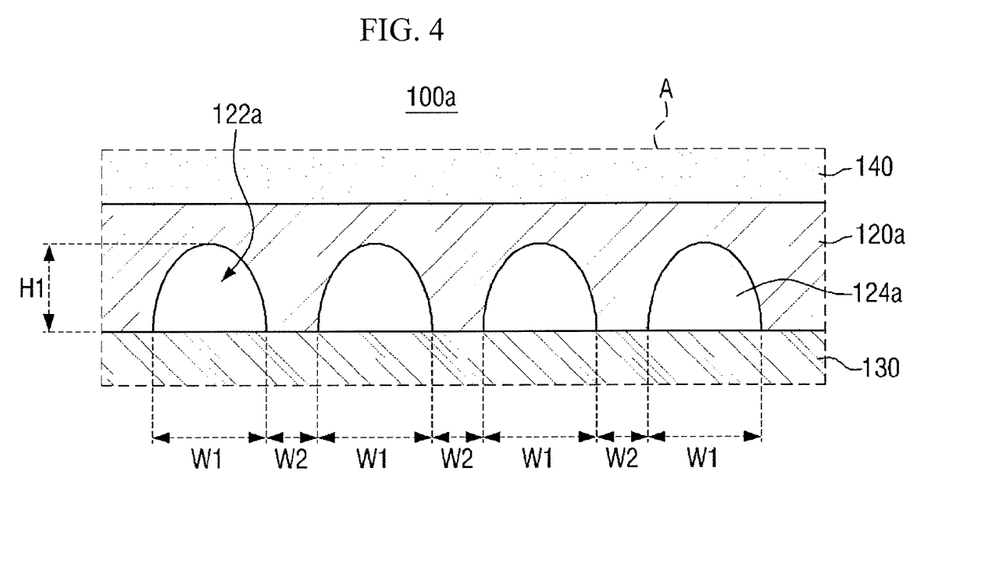
FIG. 4 is an enlarged cross-sectional view of a portion 'A' of FIG. 3 in a first polarization plate of an LCD according to an embodiment of the present disclosure.

FIG. 4 is an enlarged cross-sectional view of a portion 'A' of FIG. 3 in a first polarization plate 100a of an LCD according to an embodiment of the present disclosure.

Referring to FIG. 4, a light scattering layer 120a of the first polarization plate 100a according to a current embodiment may include curved recessed patterns 122a on a first surface thereof which faces the polarizing layer 110. Here, the recessed patterns 122a comprehensively refer to concave shapes dug into the first surface of the light scattering layer 120a. Portions of the first surface of the light scattering layer 120a without the recessed patterns 122a may be flat.

In some embodiments, a cross-section of each of the recessed patterns 122a may have a semicircular or semielliptical shape with a predetermined width W1 and height H1 as illustrated in FIG. 4. More specifically, the recessed patterns 122a may be repeatedly formed with a predetermined distance W2 therebetween on the first surface of the light scattering layer 120a. The cross-sectional shape of each of the recessed patterns 122a illustrated in FIG. 4 is merely an example, and the cross-sectional shape of each of the recessed patterns 122a is not limited to this example. For example, the cross-sectional shape of each of the recessed patterns 122a may any other curved shape. In a current embodiment, recessed patterns 122a having a same cross-sectional shape are repeatedly formed with the predetermined distance W2 therebetween, but the present disclosure is not limited thereto.

The light scattering layer 120a of the first polarization plate 100a according to a current embodiment may be bonded to the polarizing layer 110 by an adhesive layer 130 disposed on a second side of the polarizing layer 110. The first polarization plate 100a according to the current embodiment may include a refractive layer 124a in a space defined by the adhesive layer 130 and each of the recessed patterns 122a. A refractive index of the refractive layer 124a may be less than those of the light scattering layer 120a and the adhesive layer 130. Since the refractive index of the refractive layer 124a is less than that of the light scattering layer 120a, the refractive layer 124a may laterally disperse light received from the polarizing layer 110. In addition, since the refractive index of the refractive layer 124a is less than that of the adhesive layer 130, the refractive layer 124a can totally reflect light incident upon a recessed pattern 122a at an angle equal to or greater than a critical angle.

The refractive layer 124a can be implemented by various materials having refractive indices less than the refractive index of the light scattering layer 120a. For example, the refractive layer 124a may be implemented as an air layer. That is, a space defined by the adhesive layer 130 and each of the recessed patterns 122a may be empty of any liquid or solid material.

In the first polarization plate 100a according to a current embodiment, the recessed patterns 122a may extend in one direction on the first surface of the light scattering layer 120a. That is, the recessed patterns 122a may be trenches.

Figure 5:
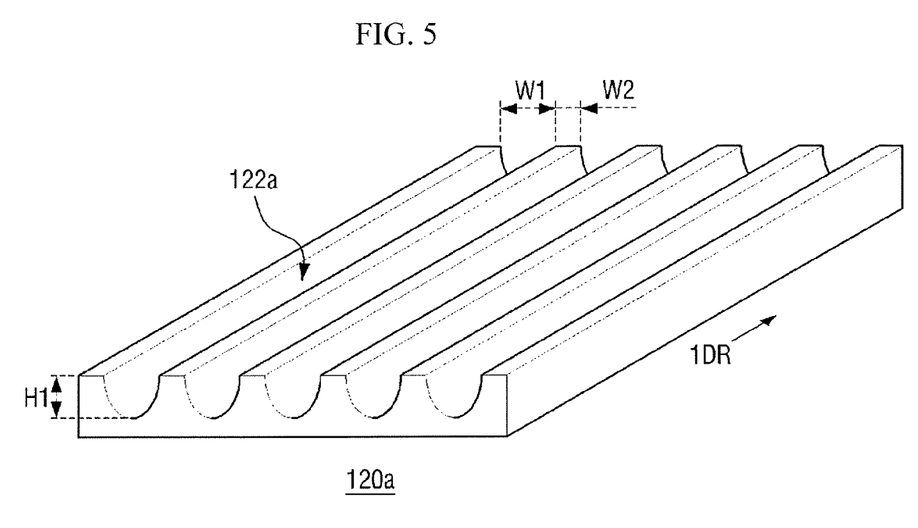
FIG. 5 is an enlarged perspective view of a light scattering layer from a portion 'B' of FIG. 2 in the first polarization plate of FIG. 4.

FIG. 5 is an enlarged perspective view of the light scattering layer 120a from portion 'B' of FIG. 2 in the first polarization plate 100a of FIG. 4, specifically, an enlarged view of the light scattering layer 120a from portion 'B' of FIG. 2 and rotated 180 degrees.

The recessed patterns 122a of the light scattering layer 120a according to a current embodiment may extend along a direction 1DR as illustrated in FIG. 5. The cross-section of each of the recessed patterns 122a may have a semicircular or semielliptical shape as illustrated in FIG. 4. More specifically, each of the recessed patterns 122a may have the predetermined width W1 and height H1 and may extend along the direction 1DR. The recessed patterns 122a shaped as described above may be repeatedly formed with the predetermined distance W2 therebetween.

When the light scattering layer 120a includes the recessed patterns 122a extending along the direction 1DR as illustrated in FIG. 5, it may laterally disperse light received from the polarizing layer 110 more evenly than when the recessed patterns of the light scattering layer 120a do not extend along a direction.

Figure 6:
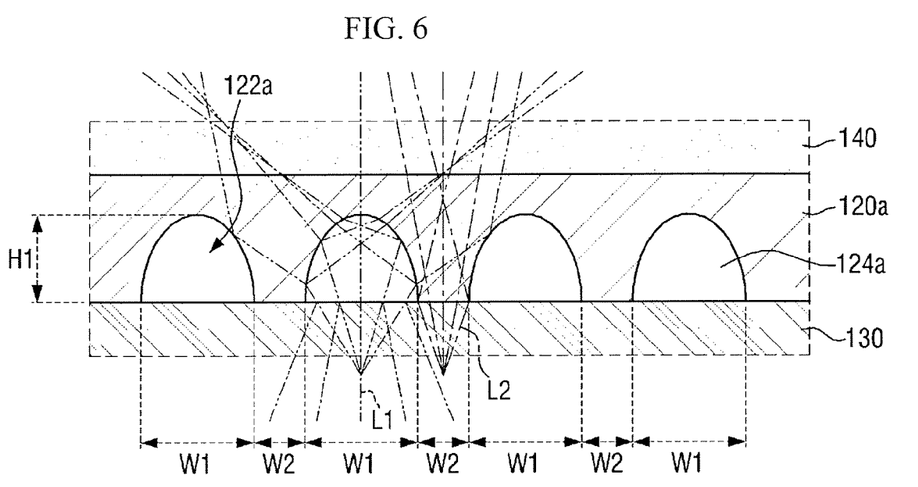
FIGS. 6 and 7 are enlarged views of the portion 'A' of FIG. 3 in the first polarization plate of FIG. 4, illustrating the dispersion of light.
Figure 7:
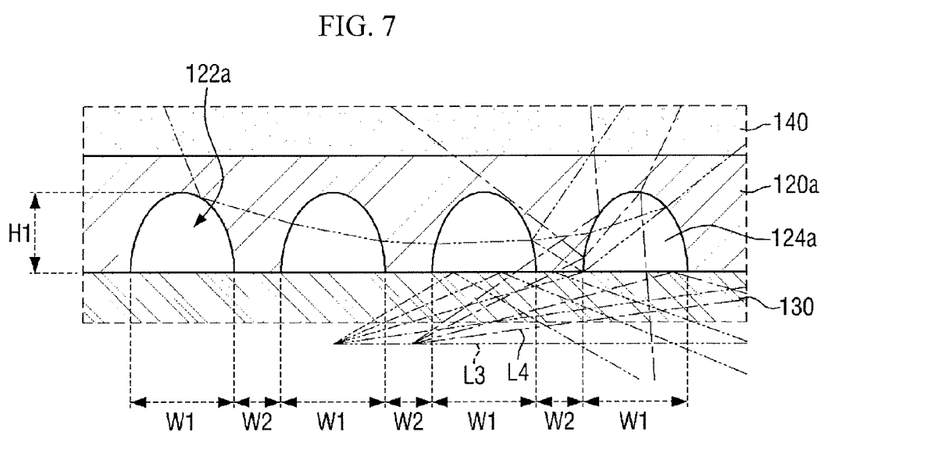

FIGS. 6 and 7 are enlarged views of portion 'A' of FIG. 3 in the first polarization plate 100a of FIG. 4, illustrating the dispersion of light. Specifically, FIG. 6 is an enlarged view of portion 'A' of FIG. 3, illustrating paths of incident light L1 and incident light L2. FIG. 7 is an enlarged view of portion 'A' of FIG. 3, illustrating paths of incident light L3 and incident light L4.

Referring to FIG. 6, in a current embodiment, each of light L1 and light L2 may be incident upon the light scattering layer 120a at an angle of about −25 to about +25 degrees with respect to a line normal to the first surface of the light scattering layer 120a. Light L1 may be incident upon the recessed patterns 122a, and light L2 may be incident upon a flat surface between the recessed patterns 122a. When incident light having an incidence angle of about −25 to about +25 degrees is received from the polarizing layer 110, the LCD 10 may be displaying an image. However, embodiments of the present disclosure are not limited thereto.

Light L1 incident upon the recessed patterns 122a may be evenly dispersed or refracted to the right or left by the curved recessed patterns 122a.

In addition, light L1 incident upon regions where the recessed patterns 122a are formed may enter the refractive layers 124a, which has a relatively low refractive index, via the adhesive layer 130, which has a relatively high refractive index. Accordingly, incident light L1 may be laterally dispersed or refracted as illustrated in FIG. 6.

Further, light L1 incident upon the regions where the recessed patterns 122a are formed may propagate toward the light scattering layer 120a, which has a relatively high refractive index, via the refractive layers 124a, which have a relatively low refractive index. Accordingly, incident light L1 may be laterally dispersed or refracted as illustrated in FIG. 6.

Light L2 incident upon the flat surface between the recessed patterns 122a may propagate in the same direction without being refracted by the recessed patterns 122a as illustrated in FIG. 6.

That is, the degree of lateral dispersion of light may vary according to a ratio of flat regions between the recessed patterns 122a to the regions where the recessed patterns 122a are formed. If the recessed patterns 122a extend along a direction as illustrated in FIG. 5, the degree of lateral dispersion can be determined from the relationship between the width W1 of each of the recessed patterns 122a and the distance W2 between the recessed patterns 122a. For example, to improve the lateral visibility of the LCD 10, the width W1 of each of the recessed patterns 122a may be made to be greater than the distance W2 between the recessed patterns 122a. However, this is merely an example, and the relationship between the width W1 of each of the recessed patterns 122a and the distance W2 between the recessed patterns 122a can be adjusted appropriately according to a desired degree of lateral visibility.

The paths of incident light L1 and incident light L2 illustrated in FIG. 6 are merely an example and can vary according to the shape of each of the recessed patterns 122a, locations where light L1 and light L2 are incident upon the light scattering layer 120a, and the refractive indices of the light scattering layer 120a, the refractive layer 124a and the adhesive layer 130.

Referring to FIG. 7, in a current embodiment, each of light L3 and light L4 may be incident upon the light scattering layer 120a at an angle of about 60 to about 90 degrees with respect to a line normal to the first surface of the light scattering layer 120a. When light having an incidence angle of about 60 to about 90 degrees is received from the polarizing layer 110, the LCD 10 may not be displaying an image. However, embodiments of the present disclosure are not limited thereto.

Light L3 and light L4 incident upon the recessed patterns 122a may enter the refractive layers 124a, which have a relatively low refractive index, via the adhesive layer 130, which has a relatively high refractive index, as illustrated in FIG. 7. Accordingly, incident light L3 and incident light L4 may be totally reflected, thus failing to propagate through the light scattering layer 120a.

Light L3 and light L4 incident upon the flat surface between the recessed patterns 122a can propagate through the light scattering layer 120a. However, the paths of incident light L3 and incident light L4 may change as incident light L3 and incident light L4 are refracted by the refractive layers 124a as illustrated in FIG. 7.

That is, the degree of total reflection may vary according to the ratio of the flat regions between the recessed patterns 122a to the regions where the recessed patterns 122a are formed. If the recessed patterns 122a extend along a direction as illustrated in FIG. 5, the degree of total reflection can be determined from the relationship between the width W1 of each of the recessed patterns 122a and the distance W2 between the recessed patterns 122a. For example, to improve the degree of total reflection of the LCD 10, the width W1 of each of the recessed patterns 122a may be greater than the distance W2 between the recessed patterns 122a. However, this is merely an example, and the relationship between the width W1 of each of the recessed patterns 122a and the distance W2 between the recessed patterns 122a can be adjusted appropriately according to a desired degree of total reflection.

In some embodiments, the recessed patterns 122a of the light scattering layer 120a may extend along the direction 1DR on the first surface thereof which faces the polarizing layer 110 as illustrated in FIG. 5. However, this is merely an example, and the recessed patterns 122a may not necessarily extend along a direction. For example, the recessed patterns 122a of the light scattering layer 120a may have a semi-spheroidal or a semiellipsoidal shape. Specifically, the light scattering layer 120a may include recessed patterns having a predetermined width and height, and the recessed patterns may be repeatedly formed with a predetermined distance therebetween on the first surface of the light scattering layer 120a which faces the polarizing layer 110.

In some embodiments, the light scattering layer 120a includes the recessed patterns 122a having the same shape as illustrated in FIGS. 4 through 7. However, the recessed patterns 122a may not necessarily have the same shape, and the light scattering layer 120a may also include recessed patterns having different shapes.

Figure 8:
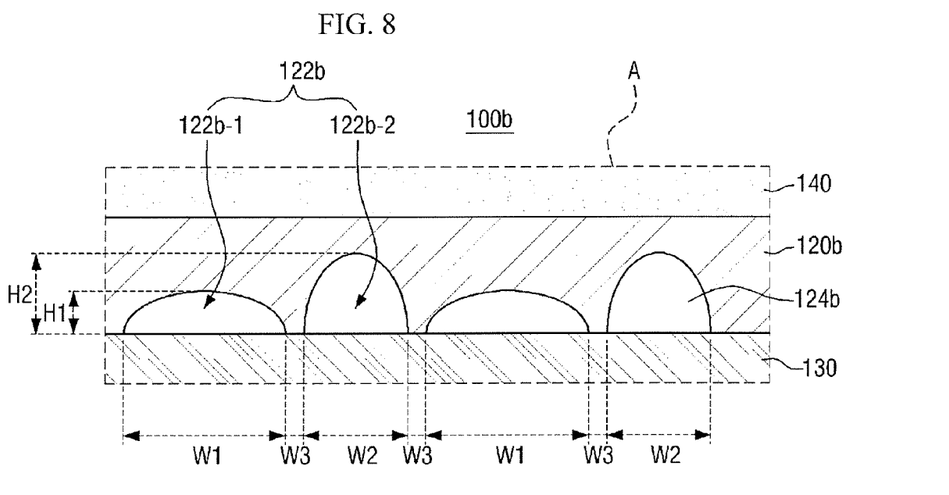
FIG. 8 is an enlarged cross-sectional view of the portion 'A' of FIG. 3 in a first polarization plate of an LCD according to another embodiment of the present disclosure.

FIG. 8 is an enlarged cross-sectional view of the portion 'A' of FIG. 3 in a first polarization plate 100b of an LCD according to another embodiment of the present disclosure.

Referring to FIG. 8, the first polarization plate 100b according to a current embodiment is identical or similar to the first polarization plate 100a according to an embodiment of FIG. 4 except for the configuration of a light scattering layer 120b, and thus a redundant description thereof will be omitted. The first polarization plate 100b will hereinafter be described, focusing mainly on differences with the first polarization plate 100a of FIG. 4.

The light scattering layer 120b may include recessed patterns 122b on a first surface thereof which faces a polarizing layer 110, and cross-sectional shapes of the recessed patterns 122b may be as illustrated in FIG. 8. The recessed patterns 122b may include first curved intaglio patterns 122b-1 and second curved intaglio patterns 122b-2.

A cross-section of each of the first intaglio patterns 122b-1 may have a semicircular or semielliptical shape having a predetermined width W1 and height H1 as illustrated in FIG. 8. A cross-section of each of the second intaglio patterns 122b-2 may have a semicircular or semielliptical shape having a predetermined width W2 and height H2 as illustrated in FIG. 8. The first intaglio patterns 122b-1 and the second intaglio patterns 122b-2 may be alternately formed on the first surface of the light scattering layer 120b, as illustrated in FIG. 8.

The cross-section of each of the first intaglio patterns 122b-1 and the cross-section of each of the second intaglio patterns 122b-2 may have different aspect ratios as illustrated in FIG. 8. An aspect ratio refers to a ratio of width to height. An aspect ratio (H1/W1) of each of the first intaglio patterns 122b-1 may be less than an aspect ratio (H2/W2) of each of the second intaglio patterns 122b-2.

The first intaglio patterns 122b-1 and the second intaglio patterns 122b-2 may extend along a direction.

Figure 9:
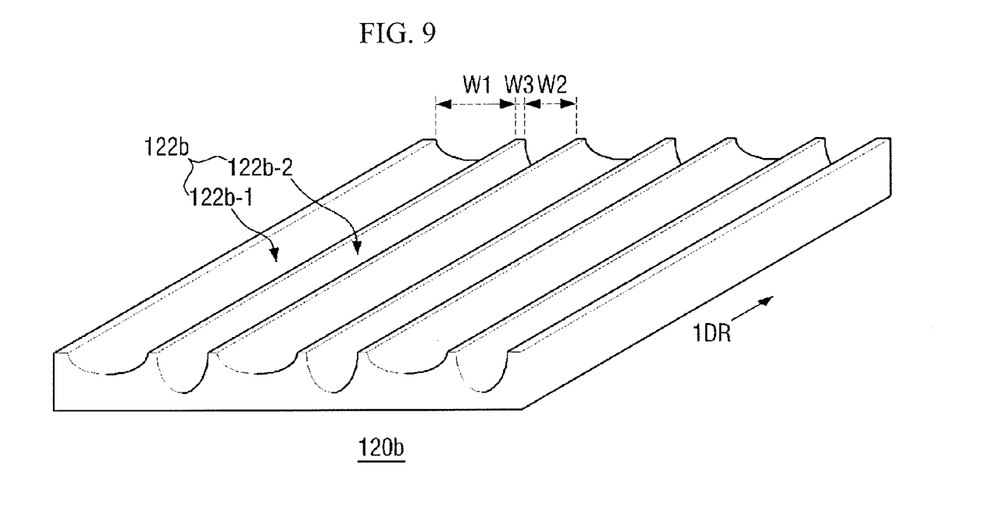
FIG. 9 is an enlarged perspective view of a light scattering layer separated from the portion 'B' of FIG. 2 in the first polarization plate of FIG. 8.

FIG. 9 is an enlarged perspective view of the light scattering layer 120b at portion 'B' of FIG. 2 in the first polarization plate 100b of FIG. 8, specifically, an enlarged view of the light scattering layer 120b at portion 'B' of FIG. 2 and rotated 180 degrees.

Referring to FIG. 9, the recessed patterns 122b of the light scattering layer 120b according to a current embodiment may extend along a direction 1DR. More specifically, the first intaglio patterns 122b-1, which have predetermined width W1, height H1 and extend along the direction 1DR, and the second intaglio patterns 122b-2, which have predetermined width W2, height H2 and extend along the direction 1DR, may be alternately formed with a predetermined distance W3 therebetween on the first surface of the light scattering layer 120b. The distance W3 between the first intaglio pattern and the second intaglio pattern may be less than the respective widths W1 and W2 of each of the first intaglio patterns and the second intaglio patterns.

When the first intaglio patterns 122b-1 and the second intaglio patterns 122b-2 of the recessed patterns 122b of the light scattering layer 120b have different shapes as illustrated in FIGS. 8 and 9, light received from the polarizing layer 110 can be laterally dispersed more widely than when the recessed patterns 122b of the light scattering layer 120b have the same shape.

Figure 10:
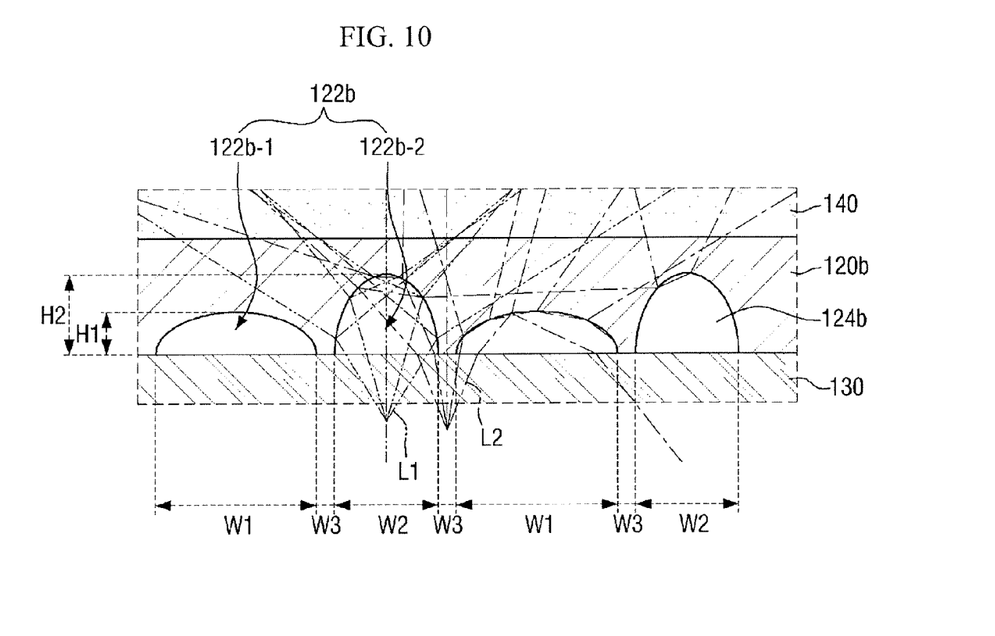
FIGS. 10 and 11 are enlarged views of the portion 'A' of FIG. 3 in the first polarization plate of FIG. 8, illustrating the dispersion of light.
Figure 11:
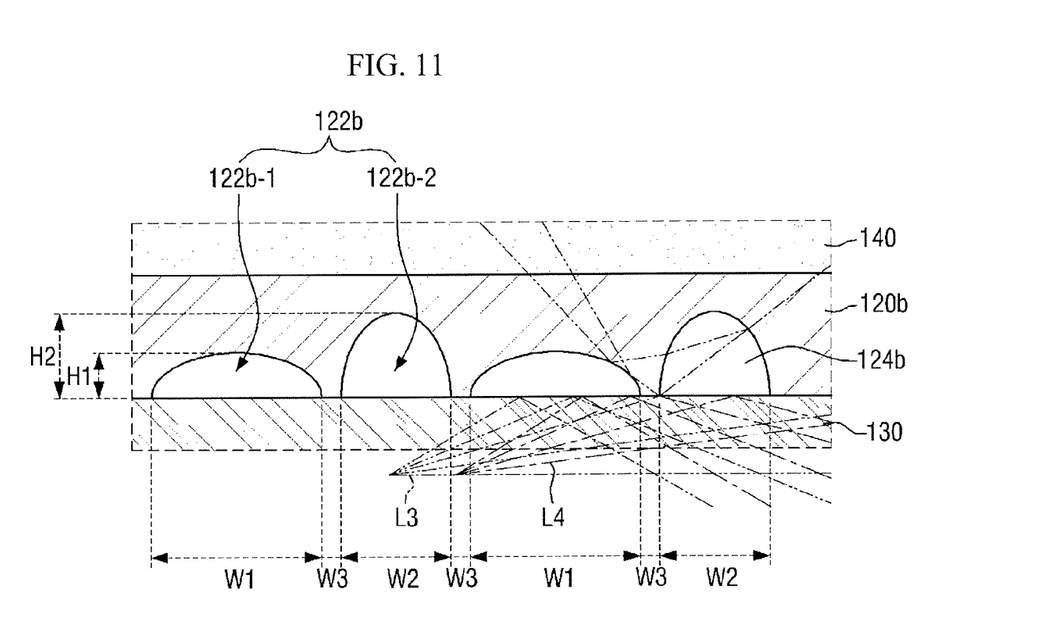

FIGS. 10 and 11 are enlarged views of portion 'A' of FIG. 3 in the first polarization plate 100b of FIG. 8, illustrating the dispersion of light. Specifically, FIG. 10 is an enlarged view of portion 'A' of FIG. 3, illustrating paths of incident light L1 and incident light L2. FIG. 11 is an enlarged view of portion 'A' of FIG. 3, illustrating paths of incident light L3 and incident light L4.

Referring to FIG. 10, in a current embodiment, each of light L1 and light L2 may be incident upon the light scattering layer 120b at an angle of about −25 to about +25 degrees with respect to a line normal to the first surface of the light scattering layer 120b. Light L1 may be incident upon the first intaglio patterns 122b-1, and light L2 may be incident not only upon a flat surface between the recessed patterns 122b but also upon the first intaglio patterns 122b-1 and the second intaglio patterns 122b-2. When incident light has an incidence angle of about −25 to about +25 degrees is received from the polarizing layer 110, an LCD 10 may be displaying an image. However, embodiments of the present disclosure are not limited thereto.

Light L1 and light L2 incident upon the first intaglio patterns 122b-1 and the second intaglio patterns 122b-2 may be evenly dispersed or refracted to the right and left by curved surfaces of the first intaglio patterns 122b-1 and the second intaglio patterns 122b-2.

In addition, light L1 and light L2 incident upon the first intaglio patterns 122b-1 and the second intaglio patterns 122b-2 may propagate toward the light scattering layer 120b, which has a relatively high refractive index, via refractive layers 124b which have a relatively low refractive index. Accordingly, incident light L1 and incident light L2 may be laterally dispersed or refracted as illustrated in FIG. 10.

Further, light L1 and light L2 incident upon the first intaglio patterns 122b-1 and the second intaglio patterns 122b-2 may enter the refractive layers 124b, which have a relatively low refractive index, via an adhesive layer 130, which has a relatively high refractive index. Accordingly, incident light L1 and incident light L2 may be laterally dispersed or refracted as illustrated in FIG. 10.

Light L1 and light L2 incident upon the first intaglio patterns 122b-1 and the second intaglio patterns 122b-2 may be laterally dispersed or refracted more widely by the first and second intaglio patterns 122b-1 and 122b-2, which have different aspect ratios and shapes, than by recessed patterns having the same shape.

Of light L2, light incident upon the flat surface between the recessed patterns 122b may propagate in the same direction without being refracted by the recessed patterns 122b as illustrated in FIG. 10.

Referring to FIG. 11, in a current embodiment, each of light L3 and light L4 may be incident upon the light scattering layer 120b at an angle of about 60 to about 90 degrees with respect to a line normal to the first surface of the light scattering layer 120b. When incident light has an incidence angle of about 60 to about 90 degrees is received from the polarizing layer 110, the LCD 10 may not be displaying an image. However, embodiments of the present disclosure are not limited thereto.

Light L3 and light L4 incident upon the first intaglio patterns 122b-1 and the second intaglio patterns 122b-2 may enter the refractive layers 124b, which have a relatively low refractive index, via the adhesive layer 130, which has a relatively high refractive index, as illustrated in FIG. 11. Accordingly, incident light L3 and incident light L4 may be totally reflected, thus failing to propagate through the light scattering layer 120b.

In addition, light L3 and light L4 incident upon the flat surface between the recessed patterns 122b can propagate through the light scattering layer 120b. However, paths of incident light L3 and incident light L4 may change as incident light L3 and incident light L4 are refracted by the refractive layers 124b as in FIG. 6.

A polarization member according to an embodiment of the present disclosure can evenly laterally disperse light received from a polarizing layer.

In addition, a display device according to an embodiment of the present disclosure may have superior lateral visibility.

However, the effects of embodiments of the present disclosure are not restricted to those set forth herein. The above and other effects of embodiments of the present disclosure will become more apparent to one of ordinary skill in the art to which embodiments of the present disclosure pertain by referencing the claims.

While embodiments of the present disclosure have been particularly shown and described with reference to exemplary embodiments thereof, it will be understood by those of ordinary skill in the art that various changes in form and detail may be made therein without departing from the spirit and scope of the exemplary embodiments of the present disclosure as defined by the following claims. The exemplary embodiments should be considered in a descriptive sense only and not for purposes of limitation.

What is claimed is:

1. A polarization member comprising:
    a polarizing layer which polarizes light; and
    a light scattering layer that has a first surface which faces the polarizing layer and a second surface, and scatters light received from the polarizing layer,
    wherein the light scattering layer comprises curved recessed patterns on the first surface, wherein the curved recessed patterns comprise concave shapes dug into the first surface, wherein a cross-sectional shape of each recessed pattern extends along one direction on the first surface, and
    wherein a width of each of the curved recessed patterns gradually decreases toward the second surface from the first surface.

2. The polarization member of claim 1, wherein a cross-section of each of the curved recessed patterns in a plane normal to the first surface has a semicircular or semielliptical shape.

3. The polarization member of claim 1, wherein the curved recessed patterns comprise a first intaglio pattern and a second intaglio pattern separated from each other, wherein the first intaglio pattern and the second intaglio pattern are alternately formed on the first surface.

4. The polarization member of claim 3, wherein an aspect ratio of the first intaglio pattern differs from an aspect ratio of the second intaglio pattern.

5. The polarization member of claim 3, wherein a distance between the first intaglio pattern and the second intaglio pattern is less than a width of each of the first intaglio pattern and the second intaglio pattern.

6. The polarization member of claim 1, further comprising:
    an adhesive layer which bonds the polarizing layer and the light scattering layer together; and
    a refractive layer disposed in a space defined by the adhesive layer and each of the curved recessed patterns,
    wherein a refractive index of the refractive layer is less than that of the light scattering layer.

7. The polarization member of claim 6, wherein the refractive layer comprises air.

8. The polarization member of claim 1, further comprising a protective layer disposed on a side of the light scattering layer, wherein the protective layer contains at least one of polyethylene terephthalate (PET) and tri-acetate cellulose (TAC).

9. A display device comprising:
    a display panel configured to display an image using light; and
    a first polarization member disposed on a side of the display panel and which polarizes light from the display panel in a first direction,
    wherein the first polarization member comprises:
        a polarizing layer which polarizes light; and
        a light scattering layer which has a first surface which faces the polarizing layer and a second surface, and scatters light received from the polarizing layer,
        wherein the light scattering layer comprises curved recessed patterns on the first surface, wherein the curved recessed patterns comprise concave shapes dug into the first surface, wherein a cross-sectional shape of each curved recessed pattern extends along one direction on the first surface, and
        wherein a width of each of the curved recessed patterns gradually decreases toward the second surface from the first surface.

10. The display device of claim 9, wherein a cross-section of each of the curved recessed patterns in a plane normal to the first surface has a semicircular or semielliptical shape.

11. The display device of claim 9, wherein the curved recessed patterns comprise a first intaglio pattern and a second intaglio pattern separated from each other, wherein the first intaglio pattern and the second intaglio pattern are alternately formed on the first surface.

12. The display device of claim 11, wherein an aspect ratio of the first intaglio pattern differs from an aspect ratio of the second intaglio pattern.

13. The display device of claim 11, wherein a distance between the first intaglio pattern and the second intaglio pattern is less than a width of each of the first intaglio pattern and the second intaglio pattern.

14. The display device of claim 9, further comprising:
    an adhesive layer which bonds the polarizing layer and the light scattering layer together; and
    a refractive layer disposed in a space defined by the adhesive layer and each of the curved recessed patterns,
    wherein a refractive index of the refractive layer is less than that of the light scattering layer.

15. The polarization member of claim 14, wherein the refractive layer comprises air.

16. The display device of claim 9, wherein the first polarization member further comprises a protective layer disposed on a side of the light scattering layer, wherein the protective layer contains at least one of PET and TAC.

17. A polarization member comprising:
    a polarizing layer which polarizes light; and
    a light scattering layer that has a first surface which faces the polarizing layer and a second surface, and scatters light received from the polarizing layer,
    wherein the light scattering layer comprises semiellipsoidal-shaped recessed patterns on the first surface, when viewed in a cross-section in a plane normal to the first surface.

18. The polarization member of claim 17, wherein the semiellipsoidal-shaped recessed patterns comprise a first intaglio pattern and a second intaglio pattern separated from each other, wherein the first intaglio pattern and the second intaglio pattern are alternately formed on the first surface, an aspect ratio of the first intaglio pattern differs from an aspect ratio of the second intaglio pattern, and a distance between the first intaglio pattern and the second intaglio pattern is less than a width of each of the first intaglio pattern and the second intaglio pattern.

* * * * *